United States Patent [19]
Haynes

[11] Patent Number: 5,029,812
[45] Date of Patent: Jul. 9, 1991

[54] VALVE SEAT MECHANISM

[75] Inventor: Brian Haynes, Ackworth, England

[73] Assignee: Cooper Industries, Inc., Houston, Tex.

[21] Appl. No.: 553,447

[22] Filed: Jul. 13, 1990

[30] Foreign Application Priority Data

Aug. 18, 1989 [GB] United Kingdom ............... 8918842

[51] Int. Cl.$^5$ ............................................. F16K 3/00
[52] U.S. Cl. ..................................... 251/327; 251/328
[58] Field of Search ............................... 251/327, 328

[56] References Cited
U.S. PATENT DOCUMENTS 3,006,599 10/1961 Eckert ........................... 251/328 X
4,629,161 12/1986 Jones et al. ..................... 251/327 X Primary Examiner—Gerald A. Michalsky
Attorney, Agent, or Firm—Jackie Lee Duke; Nelson A. Blish; Alan R. Thiele

[57] ABSTRACT

A gate valve includes a gate cavity (18), a flowbore (14, 16) communicating with the gate cavity and a gate (20) for opening and closing flow through the flowbore. A valve seat (42) is provided on each side of the gate. Each valve seat (42) has inner and outer C-ring seals (52, 54) on its end surface for sealing against a body sealing surface (46). The seals are energized by an assembly which includes a disc spring (62) disposed around the valve seat (42).

3 Claims, 2 Drawing Sheets

VALVE SEAT MECHANISM

BACKGROUND

This invention relates to gate valves. Gate valves generally comprise a body furnished with an internal gate cavity positioned generally perpendicular to a flow bore which extends through the body communicating the cavity to the inlet and outlet bores. A gate is positioned in this cavity, the gate being movable by external means. With the gate in its closed position flow between the inlet and outlet bores is sealed and with the gate in its open position full bore flow is allowed.

Gate valves are known which have seat mechanisms either side of the gate which engage the body surfaces surrounding the inlet and outlet flow bores through the body together with gate sealing faces. Such seats are generally disposed in annular recesses known as seat pockets provided in the body around the inlet and outlet bores at positions where they communicate with the gate cavity.

Many arrangements are known for such seat structures. A problem with such structures is to provide an effective full metal seal between the seat and the body which not only gives a consistent seal but also protects the critical sealing surfaces from well bore particulate contamination. Arrangements are known for example where non-metallic seals have been provided either on the end face of the seat where it abuts the body or on the seats outside diameter.

Another arrangement uses inner and outer metallic sealing rings, such as metal C-ring seals, located in inner and outer grooves on an end face of the seat and the seat is locked in position in its recess by means of a locking ring which engages an outer circumferential surface of the seat, the locking ring itself being held in position by a retainer wire. The locking ring is used to load the seat against the body energising the C-ring seals, effecting a seat/body seal. Known problems exist with this particular design, mainly due to the uneven loading of the seat mechanism after installation leading to reduced sealing capabilities.

The A. U. Bryant U.S. Pat. No. 2,777,664 discloses various shapes of metal-to-metal seals for use with gate and ball valves. Those structures suitable for use with a gate valve require a welding of the seal body to the valve body.

The E. E. Hulsey U.S. Pat. No. 3,497,177 shows a seal assembly for a gate valve whereby a Belleville spring is used to maintain an elastomer seal in face-to-face contact with the gate. No provision for metal-to-metal sealing is made.

The Allen U.S. Pat. No. 3,771,545 discloses a Bellville spring used in a ball valve to maintain an elastomer seal ring in sealing engagement with the spherical closure member.

The Kindersley U.S. Pat. No. 4,217,923 shows a spring metallic cylindrical bellows with convolutions in combination with a C shaped metal seal on a valve seat used in a ball valve.

SUMMARY

The present invention is concerned with an improved seat mechanism for a gate valve.

The present invention provides a gate valve comprising a body having a gate cavity and a flowbore extending through the body and opening into the gate cavity, a recess or seat pocket around the openings of the flowbore to gate cavity, and a seat mechanism disposed in each recess, sealing means associated with each seat mechanism for sealing against the body sealing surface, and a gate positioned in said cavity between said seat mechanism and movable to open and seal a flow path through the flowbore, wherein each said seat mechanism comprises an assembly which by means of a disc spring energises said sealing means to provide a seal between the seat and body sealing surface.

An object of the present invention is to provide an improved seat mechanism for a gate valve with metal-to-metal sealing capabilities.

Another object of the present invention is to provide a seat seal mechanism in which the metal-to-metal seal between the seat and body cavity is maintained as the seal undergoes normal wear.

BRIEF DESCRIPTION OF THE DRAWINGS

These and other objects and advantages of the present invention are set forth below and further made clear by reference to the drawings wherein.

DESCRIPTION OF THE PREFERRED EMBODIMENT

Figure 1:
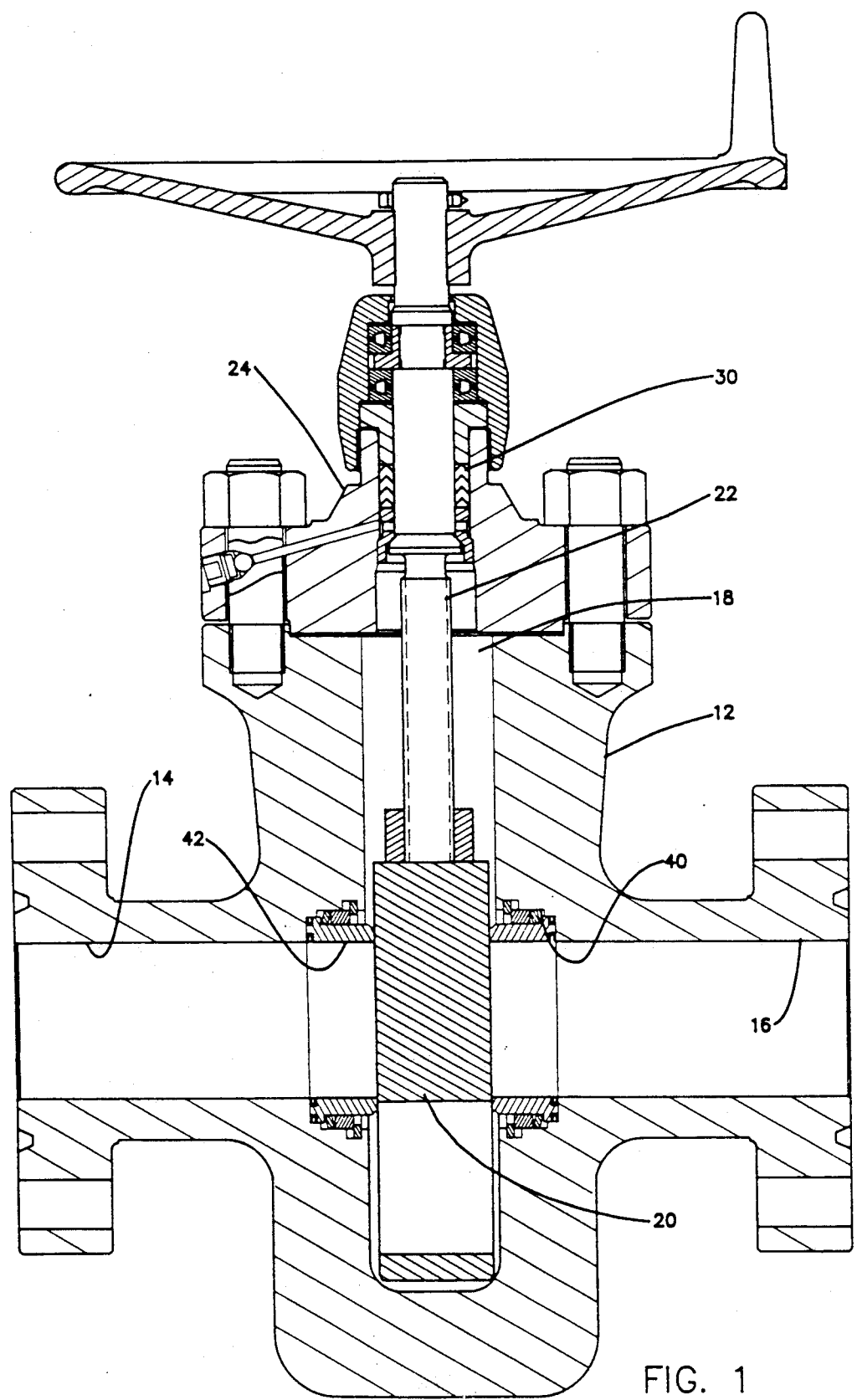
FIG. 1 is a sectional elevation of a gate valve in accordance with the present invention.

Referring to the drawings, a gate valve comprises a body (12) having an inlet (14) and an outlet (16) which communicates with a gate cavity (18). A one piece slab gate (20) is disposed within this cavity (18) and is movable via a stem (22) upwardly and downwardly by suitable actuating means, between a position in which it allows fluid to flow between the inlet and outlets (14, 16) and a position in which it closes and hence seals the flow. A bonnet (24) is secured to the body (12). The stem (22) extends upwardly through the bonnet (24) and is sealed therein by a sealing assembly (30).

Figure 2:
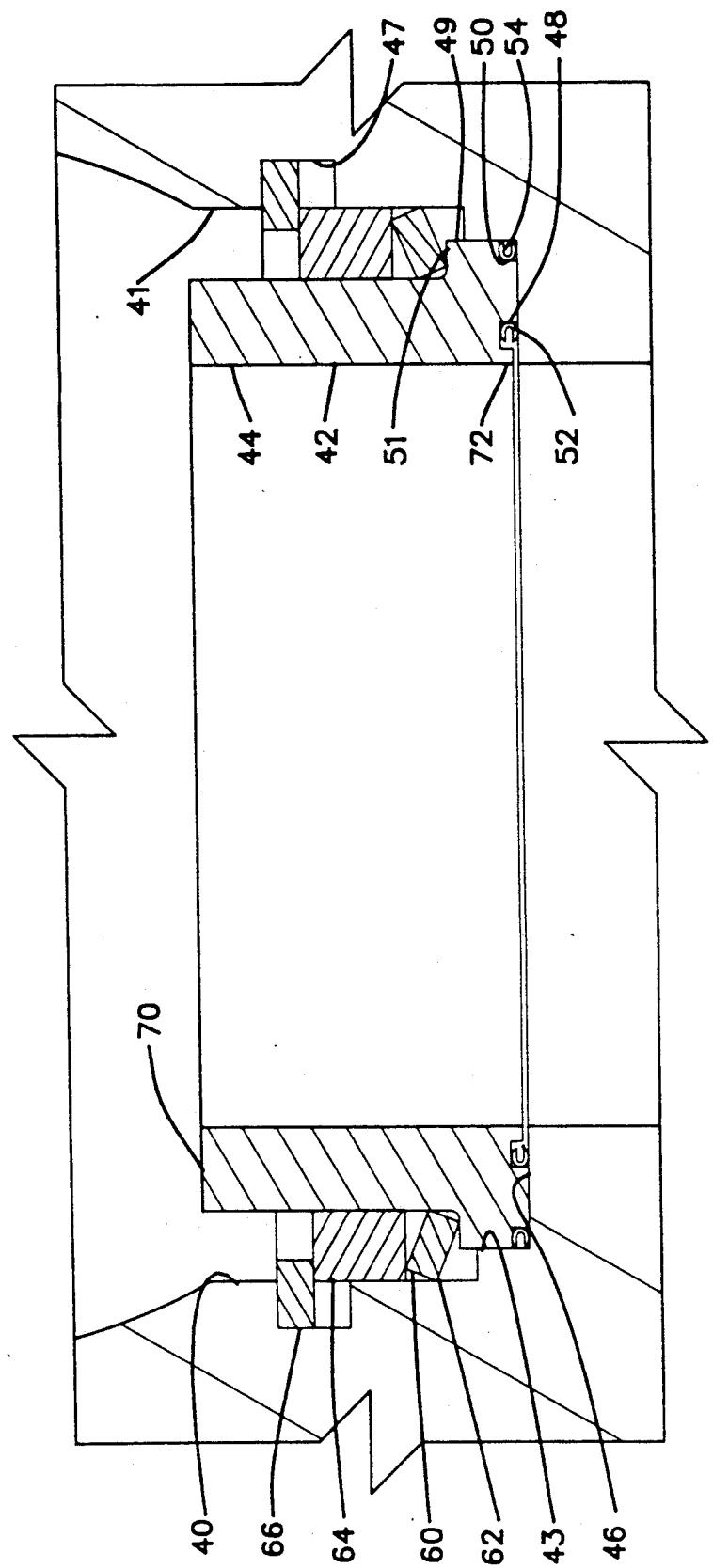
FIG. 2 is a scrap section showing on an enlarged scale a seat assembly in accordance with the present invention.

The inlet and outlet bores (14, 16) are both provided at their junction with the cavity (18) with annular recesses or seat pockets (40). These annular recesses each accommodate a valve seat (42). Referring particularly to FIG. 2 each seat pocket has a larger diameter portion (41) which extends from the gate cavity (18) over a substantial portion of the axial extent of the recess and a smaller diameter portion (43), which terminates at a body sealing surface (46). The wall of the larger diameter (41) is formed with a square sectioned, intermittently cut, annular groove (47). Each seat is annular and has a major portion (44) which is located in the recess (41) and protrudes into the cavity (18) to a position adjacent the gate (20) and a larger diameter portion (49) near its junction with the body sealing surface (46). An annular shoulder (51) is formed at the junction of the seat portion (44 and 49). The end face of the seat which is adjacent to the body sealing surface (46) has inner and outer annular grooves (48, 50). Each annular groove accommodates a metal uni-directional C-ring seal (52, 54).

An assembly (60) for biassing the seals (52 and 54) into sealing engagement with the body sealing surface (46) is located around the outer periphery of the seat (42) within the seat pocket (40). This assembly comprises a disc or Belleville type spring (62) which abuts the seats shoulder (51), an annular load ring (64) and a split retainer ring (66) which is located in the annular groove (47) formed in the circumferential wall of the recess. The spring force generated by the disc spring (62) is sufficient to hold the seat (42) in permanent contact with the body sealing surface (46) at all times, energising the metal C-rings (52, 54) thereby generating metal sealing between the seat and the body sealing surface. The metal C-rings (52,54) require a high force to achieve and maintain their seal between the seat and body sealing surfaces. Due to the size constraints of the valve, this requires the disc spring (62) to be constructed of a high strength material suitable for use in the corrosive environment of well bore fluids which flow through a gate valve. Applicant has used a disc spring (62) of Inconel material and found this to meet these criteria. This method of sealing also prevents intrusion of particulate contamination between the seat and body surfaces, which if allowed could lead to pitting and finally washout leakage. Strategical positioning of the C-rings ensures no separation of seat and body during valve operation, any pressure fluctuations in the value biassing the seat (42) into the seat pocket even in the event of the unlikely breakdown of the C-ring seals.

To prevent possible collapse into the flowbore of the inner C-ring seal (52) on leakage of the outer C-ring seal (54) a raised lip (72) is formed at the inner edge of the inner groove (48) on the seat (42). This lip gives added support to the inner C-ring seat (52) if subjected to reverse pressure.

The opposite end sealing surface (70) of the valve seat relies on good surface finish and flatness properties to provide metal-to-metal sealing with the gate (20) when the gate is moved to its closed position.

In order to assemble the seat mechanism the inlet and outlet seat members are located in their respective seat pockets. At this stage neither the gate (20), stem (22) or bonnet (24) are in position. On one side the disc spring (62), load ring (64) and retainer ring (66) are then located around the outer periphery of the seat and forced against the seat shoulder (51) by means of a hydraulic jacking tool. Once sufficient load has been applied to the load ring, and hence to the disc spring, the retainer ring (66) is snapped outwardly by means of an appropriate tool into the groove (47) formed in the circumferential wall of the recess in the body. The jacking tool load is then released leaving the mechanism in a fully locked-in condition. The same procedure is then performed on the opposite side after which the gate may be installed.

What is claimed is:

1. A gate valve comprising:
   a body having a gate cavity and a flowbore extending through the body and opening into the gate cavity,
   a recess or seat pocket around the openings of the flowbore to said gate cavity, and a seat mechanism disposed in each recess,
   said recess terminating in a body sealing surface,
   sealing means associated with each seat mechanism for sealing against the body sealing surface, including a valve seat with inner and outer grooves on the end face of said valve seat with a metal C-ring seal disposed in each of said inner and outer grooves, and
   a gate positioned in said cavity between said valve seats and movable to open and seal a flow path through the flowbore, wherein each said valve seat is urged by means of a disc spring to energize and maintain said metal C-ring seals in metal-to-metal sealing engagement with said valve seat and said body sealing surface.

2. A gate valve according to claim 1 wherein each said disc spring is retained against a profile on the valve seat by a loading ring disposed around said valve seat and a retainer ring located in an annular groove formed in the wall of said recess, and
   said disc spring urges said valve seat and said metal C-ring seals positioned thereon into sealing engagement with said body sealing surface.

3. A gate valve according to claim 1 wherein said disc spring is formed from Inconel.

* * * * *